United States Patent [19]
Victor

[11] Patent Number: 5,920,284
[45] Date of Patent: Jul. 6, 1999

[54] AMBIGUITY RESOLUTION FOR AMBIGUOUS POSITION SOLUTIONS USING SATELLITE BEAMS

[75] Inventor: Edward B. Victor, Boulder, Colo.

[73] Assignee: Qualcomm Incorporated, San Diego, Calif.

[21] Appl. No.: 08/723,723

[22] Filed: Sep. 30, 1996

[51] Int. Cl.[6] ............................. G01S 5/02; H04B 7/185
[52] U.S. Cl. .................................. 342/357.01; 455/12.1; 455/13.1; 342/357.04
[58] Field of Search ..................... 342/357, 457; 455/12.1, 13.1; 701/213

[56] References Cited

U.S. PATENT DOCUMENTS

| | | | |
|---|---|---|---|
| 4,744,083 | 5/1988 | O'Neill et al. | 371/22 |
| 5,412,388 | 5/1995 | Attwood | 342/357 |
| 5,412,389 | 5/1995 | Olds | 342/357 |
| 5,500,648 | 3/1996 | Maine et al. | 342/357 |
| 5,543,813 | 8/1996 | Araki et al. | 342/357 |
| 5,548,801 | 8/1996 | Araki et al. | 455/13.1 |
| 5,552,795 | 9/1996 | Tayloe et al. | 342/357 |
| 5,619,525 | 4/1997 | Wiedeman et al. | 375/200 |

FOREIGN PATENT DOCUMENTS

| | | | |
|---|---|---|---|
| 0582073 | 2/1994 | European Pat. Off. | G01S 5/02 |

*Primary Examiner*—Thomas Tarcza
*Assistant Examiner*—Dao L. Phan
*Attorney, Agent, or Firm*—Russell B. Miller; Gregory D. Ogrod

[57] ABSTRACT

A system and method for resolving ambiguity in an ambiguous position solution for a user terminal position in a satellite communications system which includes a user terminal, at least one satellite, and a gateway communicating with the user terminal through the satellite. Each satellite has a plurality of satellite beams which each illuminate a region on the Earth in a known pattern relative to a satellite sub-track. A satellite beam illuminating the user terminal is identified along with its corresponding position relative to the sub-track. The orientations of possible user terminal positions and the identified beam relative to the satellite sub-track are compared to each other. Possible user terminal positions falling on an incorrect side of the sub-track from the detected beam illuminating the user terminal, are considered as incorrect solutions for that user terminal. The ambiguity solution can be determined using satellite identification and comparison elements in the user terminal, or at the gateway, in which case certain beam information is reported to the gateway. In further aspects of the invention, the beam being identified can be either a forward link or reverse link beam, or both, and each link has a different beam pattern.

15 Claims, 7 Drawing Sheets

AMBIGUITY RESOLUTION FOR AMBIGUOUS POSITION SOLUTIONS USING SATELLITE BEAMS

CROSS-REFERENCE TO RELATED APPLICATIONS

This application is related to a commonly-owned application, filed concurrently herewith, entitled "*Position Determination Using One Low-Earth Orbit Satellite*" having application number (to be assigned, Attorney Docket Number PA286), which is incorporated herein by reference.

BACKGROUND OF THE INVENTION

I. Field of the Invention

The present invention relates generally to object position determination using satellites. More specifically, the present invention relates to a method for resolving ambiguity in an ambiguous position solution for a user terminal in a satellite communications system.

II. Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

A variety of multiple access communications systems and techniques have been developed using time division multiple access (TDMA), frequency division multiple access (FDMA), and code division multiple access (CDMA), the basics of which are well known in the art. The use of CDMA techniques in multiple access communications systems is disclosed in U.S. Pat. No. 4,901,307, which issued Feb. 13, 1990, entitled "*Spread Spectrum Multiple Access Communication System Using Satellite or Terrestrial Repeaters*", and U.S. patent application Ser. No. 08/368,570, filed Jan. 4, 1995, entitled "*Method and Apparatus for Using Full Spectrum Transmitted Power in a Spread Spectrum Communication System for Tracking Individual Recipient Phase Time and Energy*", which are both assigned to the assignee of the present invention, and are incorporated herein by reference.

The above-mentioned patent documents disclose multiple access communications systems in which a large number of generally mobile or remote system users each employ at least one user terminal to communicate with other system users or users of other connected systems, such as a public telephone switching network. The user terminals communicate through gateways and satellites using CDMA spread-spectrum type communications signals.

Communications satellites form beams which illuminate a "spot" or area produced by projecting satellite communications signals onto the Earth's surface. A typical satellite beam pattern for a spot comprises a number of beams arranged in a predetermined coverage pattern. Typically, each beam comprises a number of so-called sub-beams (also referred to as CDMA channels) covering a common geographic area, each occupying a different frequency band.

In a typical spread-spectrum communications system, a set of preselected pseudorandom noise (PN) code sequences is used to modulate (i.e., "spread") information signals over a predetermined spectral band prior to modulation onto a carrier signal for transmission as communications signals. PN code spreading is a method of spread-spectrum transmission that is well known in the art, produces a signal for transmission that has a bandwidth much greater than that of the data signal. In a forward communications link (that is, in a communications link originating at a gateway and terminating at a user terminal), PN spreading codes or binary sequences may be used to discriminate between signals transmitted by different satellites or gateways or over different beams, and to resolve multipath signals. PN spreading codes are typically shared by communications signals within a given cell or sub-beam.

In a typical CDMA spread-spectrum system, channelizing codes are used to differentiate signals intended for various user terminals that are transmitted within a satellite beam on the forward link. That is, a series of unique orthogonal channels, including pilot and paging signal channels, are provided for transmission of information to user terminals on the forward link by using unique "channelizing" orthogonal codes. Walsh functions are generally used to implement the channelizing codes.

Typical CDMA spread-spectrum communications systems, such as disclosed in U.S. Pat. No. 4,901,307, contemplate the use of coherent modulation and demodulation for forward link user terminal communications. In communications systems using this approach, a "pilot" carrier signal (hereinafter referred to as a "pilot signal") is used as a coherent phase reference for forward links. That is, a pilot signal, which contains no data modulation, is transmitted by a gateway throughout a region of coverage. A single pilot signal is typically transmitted by each gateway for each beam used for each frequency used, that is, each sub-beam or CDMA channel. These pilot signals are shared by user terminals receiving signals from the gateway.

While each beam, or sub-beam, can be said to have a unique pilot signal (subject to system wide re-use), they may not be generated using different PN code polynomials, but can use the same spreading code with different code phase offsets. This allows PN codes that can be readily distinguished from each other, in turn distinguishing originating gateways or satellites, and beams or sub-beams. In the alternative, a series of PN spreading codes are used within the communication system with different PN codes being used for each gateway or satellite plane through which gateways communicate, and timing offsets used for each beam or sub-beam. It will be readily apparent to those skilled in the art that as many or as few PN codes as desired can be assigned to identify specific signal sources in the communication system, subject to complexity, availability, and system capacity limitations.

Pilot signals are used by user terminals to obtain initial system synchronization and time, frequency, and phase tracking of other signals transmitted by the gateway. Phase information obtained from tracking a pilot signal carrier is used as a carrier phase reference for coherent demodulation of other system signals or traffic signals. This technique allows many traffic signals to share a common pilot signal as a phase reference, providing for a less costly and more efficient tracking mechanism.

When a user terminal is not involved in a communications session (that is, the user terminal is not receiving or transmitting traffic signals), the gateway can convey information to that particular user terminal using a signal known as a paging signal. For example, when a call has been placed to a particular mobile phone, the gateway alerts the mobile phone by means of a paging signal. Paging signals are also used to distribute system overhead information.

A user terminal can respond to a paging signal by sending an access signal or access probe over the reverse link (that is, the communications link originating at the user terminal and terminating at the gateway). The access signal is also used when a user terminal originates a call. Access probes or signals may use their own sets of PN code sequences for spreading on the reverse link, providing a form of signal identification which can restrict the specific satellites or gateways that can receive and process such signals.

When communications are required with a user terminal, the communications system may need to determine the position of the user terminal. The need for user terminal position information stems from several considerations. One consideration is that the system should select an appropriate gateway for providing the communications link. For example, gateways in communication with satellites that are well elevated above a user terminal horizon may provide higher quality communication links. It is desirable to use a gateway that is in communication with such satellites. Therefore, when communications are required with a particular user terminal, the communications system needs to know the position of the user terminal, relative to various satellites, in order to select the appropriate gateway.

Another consideration is allocation of a communications link to the proper service provider (for example, a telephone company). A service provider is typically assigned a particular geographic territory, and handles all calls with users in that territory. When communications are required with a particular user terminal, the communications system can allocate the call to a service provider based on the territory within which the user terminal is located. In order to determine the appropriate territory, the communications system requires the position of the user terminal. A similar consideration arises when calls must be allocated to service providers based on political boundaries.

An important requirement in position determination for a satellite-based communications system is speed. When communications are required with a particular user terminal, the gateway that will serve the user terminal should be selected rapidly. For example, a mobile telephone user is not likely to tolerate a delay of more than a few seconds when placing a call. The desire for positioning accuracy is less important than the desire for speed; an error of less than 10 kilometers (km) is considered adequate, in order to achieve a short delay. In contrast, most conventional approaches to satellite-based position determination emphasize accuracy over speed.

Further, many conventional approaches result in ambiguous position solutions. That is, a determined position solution includes more than one possible position for a user terminal. What is needed, therefore, is a system and method for resolving the ambiguity in an ambiguous position solution.

SUMMARY OF THE INVENTION

The present invention is a system and method for resolving the ambiguity in an otherwise ambiguous solution for the position of a user terminal (for example, a mobile telephone) in a satellite communications system. The system includes a user terminal, at least one satellite, and a gateway for communicating with the user terminal through the satellite. Each satellite has a plurality of satellite beams which each illuminate a region on the Earth's surface in a known pattern relative to the satellites orbital path.

The method includes the steps of determining a plurality of possible positions of the user terminal on the Earth's surface, identifying the satellite beam illuminating the user terminal and corresponding side of the sub-track the beam is on, and comparing the possible positions with the determined sub-track side for the identified satellite beam to select one of the possible positions.

The ambiguity solution can be arrived at using satellite identification means and comparison means in the user terminal. Alternatively, a first identification means in the user terminal detects at least one beam specific parameter for a satellite beam illuminating the user terminal, such as the PN code used for the beam. Information regarding a value for the detected parameter is reported to the gateway where a second identification means receives the information and identifies the satellite beam. Since the gateway maintains information describing satellite positions and beam orientations, the gateway can determine which side of a satellite sub-track an identified beam is on, at any given time. Possible user terminal positions falling on an incorrect side of the sub-track from the detected beam illuminating the user terminal, are considered as incorrect solutions for that user terminal. Therefore, ambiguity between multiple solutions can be eliminated or reduced.

In other aspects of the invention, the beam being identified can be either a forward link or reverse link beam, or both. That is, either a beam used to receive signals from the gateway at the user terminal or from the user terminal at the gateway. The forward and reverse link beam patterns from the satellite are preferably, but not necessarily, different, and this difference can be used in some situations to create an additional ambiguity resolution.

One advantage of the present invention is that it quickly resolves the ambiguity in an ambiguous user terminal position solution.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Introduction

The present invention is a system and method for resolving ambiguity in an otherwise ambiguous position solution for a user terminal in a satellite communications system. The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention will be described in three parts. First, a typical satellite communications system is described. Second, two candidate approaches for determining an ambiguous position solution are described. Finally, the operation of a preferred embodiment of the present invention is described.

II. A Typical Satellite Communications System

Figure 1:
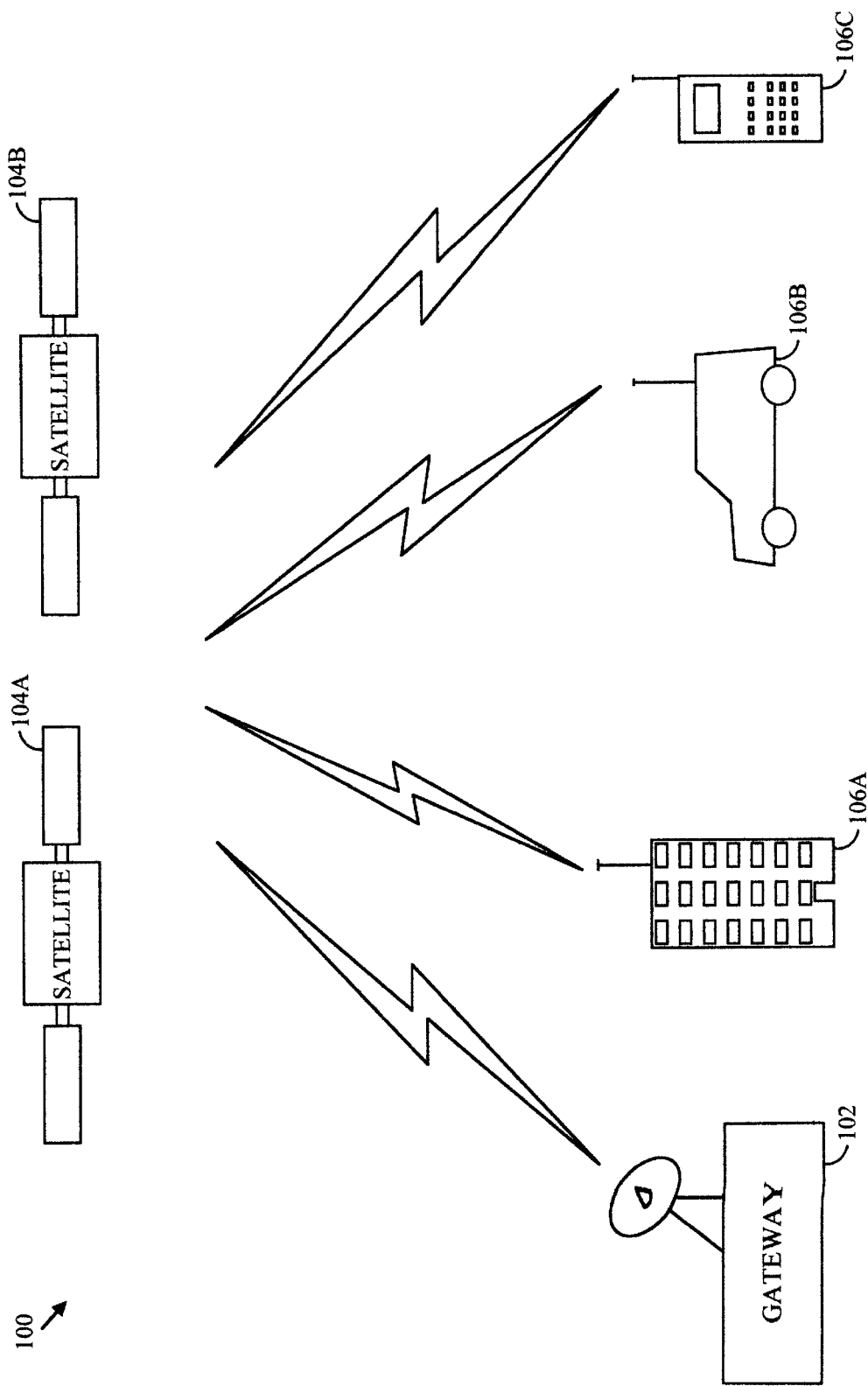
FIG. 1 depicts a typical satellite communication system.

FIG. 1 depicts a typical satellite communication system 100. Satellite communication system 100 comprises gateway 102, satellite 104, and user terminals 106. User terminals 106 are generally of three types: fixed user terminals 106A, which are typically mounted in permanent structures; mobile user terminals 106B, which are typically mounted in vehicles; and portable user terminals 106C, which are typically hand-held. Gateway 102 communicates with user terminals 106 through satellite 104.

Figure 2:
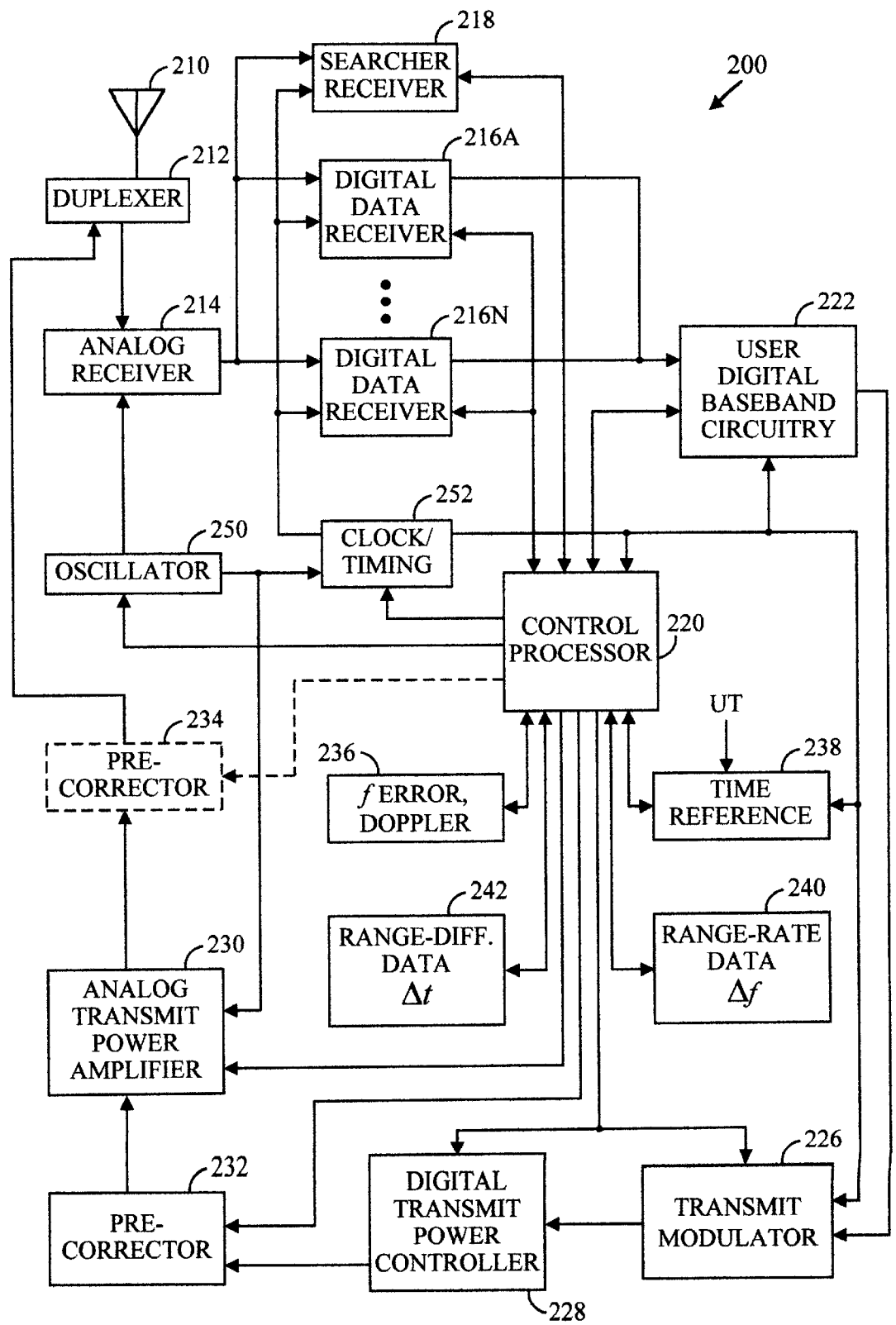
FIG. 2 is a block diagram of an exemplary transceiver for use in a user terminal.

An exemplary transceiver 200 for use in a user terminal 106 is illustrated in FIG. 2. Transceiver 200 uses at least one antenna 210 for receiving communication signals which are transferred to an analog receiver 214, where they are downconverted, amplified, and digitized. A duplexer element 212 is usually used to allow the same antenna to serve both transmit and receive functions. However, some systems employ separate antennas for operating at different frequencies.

Digital communication signals output by analog receiver 214 are transferred to at least one digital data receiver 216A and at least one digital searcher receiver 218. Additional digital data receivers 216B–216N can be used to obtain desired levels of signal diversity, depending on the acceptable level of unit complexity, as would be apparent to one skilled in the relevant art. A receiver configured in such a manner is called a "rake receiver," and each digital data receiver 216 is called a "finger." The fingers of the rake receiver are used not only for signal diversity, but also to receive signals from multiple satellites.

At least one user terminal control processor 220 is electrically coupled to digital data receivers 216A–216N and searcher receiver 218. Control processor 220 provides, among other functions, basic signal processing, timing, power and handoff control or coordination and selection of frequency used for signal carriers. Another basic control function often performed by control processor 220 is the selection or manipulation of PN code sequences or orthogonal functions to be used for processing communication signal waveforms. Control processor 220 signal processing can include a determination of the parameters employed by the present invention. Such computations of signal parameters, such as relative timing and frequency, can include the use of additional or separate dedicated circuitry to provide increased efficiency or speed in measurements or improved allocation of control processing resources.

Outputs for digital data receivers 216A–216N are electrically coupled to user digital baseband circuitry 222 within the user terminal. User digital baseband circuitry 222 comprises known processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user baseband circuitry using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communication signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Transceiver 200 can also employ one or more precorrection elements or precorrectors 232 and 234. The operation of these precorrectors is disclosed in a copending, commonly-owned application entitled "Time And Frequency Precorrection For Non-Geostationary Satellite Systems" having application number (to be assigned, Attorney Docket Number PA338), which is incorporated herein by reference. Preferably, precorrection occurs at the output of digital power controller 228 at baseband frequency. The baseband spectral information including the frequency adjustment is translated to the appropriate center frequency during up-conversion performed in transmit power amplifier 230. The precorrection or frequency adjustment is accomplished using techniques known in the art. For example, the precorrection can be effected by a complex signal rotation, which is equivalent to multiplying the signal by a factor of $e^{j\omega t}$, where $\omega$ is computed on the basis of known satellite ephemerides and desired channel frequency. This is very useful where communication signals are processed as in-phase (I) and quadrature phase (Q) channels. A direct digital synthesis device can be used to generate some of the rotation products. Alternatively, a coordinate rotation digital computation element can be used that employs binary shifts, adds, and subtracts to perform a series of discrete rotations, resulting in the desired overall rotation. Such techniques and related hardware are well understood in the art.

As an alternative, precorrection element 234 can be disposed in the transmission path on the output of transmit power amplifier 230, to adjust the frequency of the outgoing signal. This can be accomplished using well known techniques, such as up- or down-conversion of the transmission waveform. However, changing the frequency on the output of the analog transmitter can be more difficult because there is often a series of filters used to shape the waveform, and changes at this juncture may interfere with the filtering process. Alternatively, precorrection element 234 can form part of a frequency selection or control mechanism for the analog up-conversion and modulation stage (230) of the user terminal so that an appropriately adjusted frequency is used to convert the digital signal to a desired transmission frequency in one step.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220.

Data receivers 216A–N and searcher receiver 218 are configured with signal correlation elements to demodulate and track specific signals. Searcher receiver 218 is used to search for pilot signals, or other relatively fixed pattern strong signals, while data receivers 216A–N are used to track pilot signals or demodulate other signals associated with detected pilot signals. Therefore, the outputs of these units can be monitored to provide information employed to compute the parameters of the present invention. Information on the measurements made by user terminal 106 on received communication signals or shared resource signals can be sent to the gateway using a variety of techniques known in the art. For example, the information can be transferred as a separate data signal or be appended to other messages prepared by user digital baseband circuitry 222. Data receivers 216 also employ frequency tracking elements that can be monitored to provide current frequency and timing information to control processor 220 for signals being demodulated. This is discussed further below with reference to FIGS. 4 and 5.

Control processor 220 uses such information to determine to what extent the received signals are offset from an expected frequency, based on a local oscillator frequency, when scaled to the same frequency band, as appropriate. This and other information related to frequency offsets, errors and Doppler shifts, can be stored in one or more error/Doppler storage or memory elements 236, as desired. This information can be used by control processor 220 to adjust its operating frequency, or can be transferred to gateways using various communication signals.

At least one time reference element 238 is used to generate and store chronological information such as the date and time of day to assist in determining satellite positions. The time can be stored and updated periodically and may also be supplied periodically by a gateway. In addition, the current time is stored each time a user terminal enters an inactive mode such as when it is "turned off". This time value is used in conjunction with the "turn on" time to determine various time dependent signal parameters and user terminal position changes.

Additional, storage or memory elements 240 and 242 can be used to store specific information about parameters discussed in further detail below. For example, a memory element 240 can store user terminal measurements made relative to a range-rate parameter, such as differences in relative frequency offsets between two arriving signals. Memory elements 240 and 242 use structure and circuits well known in the art and can be formed either as distinct or separate elements or as a larger unified structure in which this information is stored in a controlled manner, for later retrieval.

As shown in FIG. 2, a local or reference oscillator 250 is used as a reference for the analog receiver 214 to down convert the incoming signal to baseband at the desired frequency. It can also be employed in multiple intermediate conversion steps, as desired, until the signal reaches the desired baseband frequency. As shown, oscillator 250 is also used as a reference for analog transmitter 230, for up-conversion from baseband to the desired carrier frequency for reverse link transmissions, and as a frequency standard or reference for a timing circuit 252. Timing circuit 252 generates timing signals for other stages or processing elements within user terminal 200 such as time tracking circuits, the correlators in digital receivers 216A–N and 218, transmit modulator 226, time reference element 238, and control processor 220. Timing circuit 252 can also be configured to produce delays for retarding or advancing in the relative timing of timing or clock signals, under processor control. That is, time tracking can be adjusted by predetermined amounts. This also allows the application of codes to be advanced or retarded from "normal" timing, typically by one or more chip periods, so that PN codes or chips making up the codes can be applied with different timing, as desired.

Figure 3:
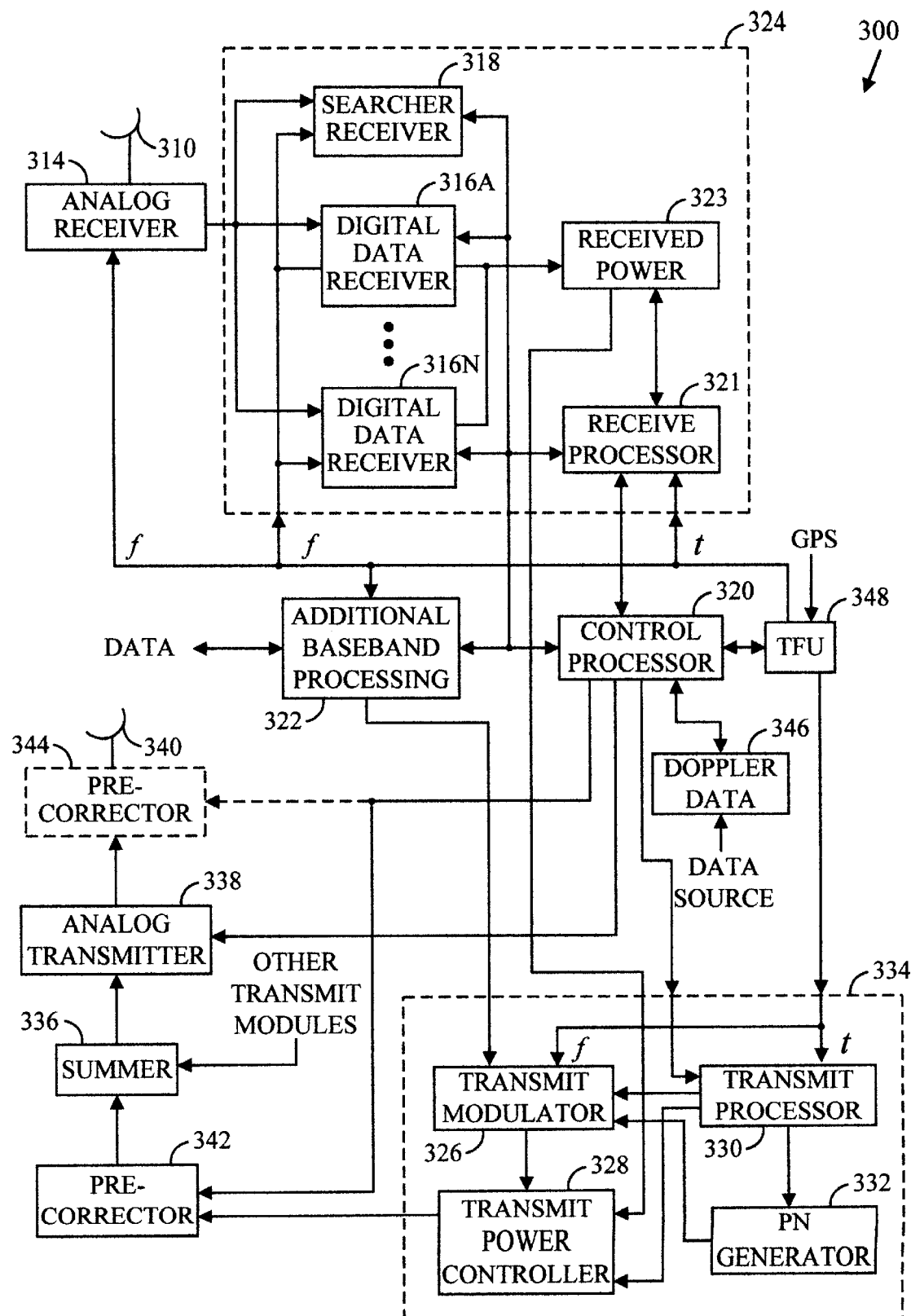
FIG. 3 is a block diagram of an exemplary transmission and reception apparatus for use in a gateway.

An exemplary transmission and reception apparatus 300 for use in a gateway 102 is illustrated in FIG. 3. The portion of gateway 102 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 102 and one user terminal 106, although certain variations are known in the art. One analog receiver 314 can provide inputs for many digital receiver modules 324, and a number of such modules are typically used in gateways 102 to accommodate all of the satellite beams and possible diversity mode signals being handled at any given time. Each digital receiver module 324 has one or more digital data receivers 316 and searcher receivers 318. Searcher receiver 318 generally searches for appropriate diversity modes of signals other than pilot signals. Where implemented in the communication system, multiple data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals 106 are each electrically coupled to one or more appropriate transmit modules 334. A typical gateway uses a number of such transmit modules 334 to provide service to many user terminals 106 simultaneously, and for several satellites and beams simultaneously. The number of transmission modules 334 used by gateway 102 is determined by factors well known in the art, including system complexity, number of satellites usually in view, user capacity, degree of diversity chosen, and the like.

Each transmit module 334 includes a transmit modulator 326 which spread-spectrum modulates data for transmission and has an output electrically coupled to a digital transmit power controller 328, which controls the transmission power used for the outgoing digital signal. Digital transmit power controller 328 generally applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 102.

The output of transmit power controller 328 is transferred to a summer 336 where it is summed with the outputs from other transmit power control circuits. Those outputs are signals for transmission to other user terminals 106 at the same frequency and within the same beam as the output of transmit power controller 328. The output of summer 336 is provided to an analog transmitter 338 for digital-to-analog conversion, conversion to the appropriate RF carrier frequency, further amplification, filtering, and output to one or more antennas 340 for radiating to user terminals 106. Antennas 310 and 340 may be the same antennas depending on the complexity and configuration of the communication system.

At least one gateway control processor 320 is electrically coupled to receiver modules 324, transmit modules 334, and baseband circuitry 322. These units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers or modules for use in user communications. Further, control processor 320 can be used to compute the parameters and execute the positioning method of the present invention. Control processor 320 also controls the generation and power of pilot, synchronization, and paging channel signals and their coupling to transmit power controller 328. The pilot signal is not modulated by data, is generally not power controlled, and may use a repetitive unchanging pattern or non-varying frame structure. That is, the orthogonal function used to form the pilot signal channel generally has a constant value, such as all 1's or 0's, or a well known repetitive pattern of interspersed 1's and 0's.

While control processor 320 can be electrically coupled directly to the elements of a module, such as transmit module 334 or receive module 324, each module generally comprises a module-specific processor, such as transmit processor 330 or receive processor 321, which controls the elements of that module. Thus, in a preferred embodiment, control processor 320 is electrically coupled to transmit processor 330 and receive processor 321, as shown in FIG. 3. In this manner, a single control processor 320 can control the operations of a large number of modules and resources more efficiently.

Transmit processor 330 controls generation of, and signal power for, pilot, synchronization, paging signals, and traffic channel signals, and their respective coupling to power controller 328. Receive processor 321 controls searching, which PN spreading codes are used for demodulation, and monitoring received power. Processor 321 can also be used in determining signal parameters employed in the method of the present invention, or can detect and transfer information received from the user terminal regarding such parameters, thereby decreasing the burden on control processor 320.

In order to implement embodiments of the present invention, one or more precorrectors or frequency precorrection elements 342 and 344 may be used. A precorrection element 342 is preferably used to adjust the frequency of the digital output of digital power controller 328 at baseband frequency. As in the user terminal, baseband spectral information including the frequency adjustment is translated to the appropriate center frequency during the up-conversion performed in analog transmitter 338. The frequency precorrection is accomplished using techniques known in the art, such as the complex signal rotation discussed above, where the angle of rotation is computed on the basis of known satellite ephemerides and desired channel frequency. As in the user terminal, other signal rotation techniques and related hardware can be used without departing from the spirit and scope of the present invention.

In FIG. 3, precorrector 342 is shown disposed in the transmission path prior to summer 336. This allows individual control over each user terminal signal as desired. However, a single frequency precorrection element can be used when precorrection is performed after summer 336, because user terminals share the same transmission path from the gateway to the satellite.

As an alternative, a precorrector 344 can be disposed in the transmission path on the output of analog transmitter 338, to adjust the frequency of the outgoing signal, using well known techniques. However, changing the frequency on the output of the analog transmitter can be more difficult, and may interfere with signal filtering processes. Alternatively, the output frequency of analog transmitter 338 can be adjusted directly by control processor 320 to provide a shifted output frequency, offset from the normal center frequency.

The amount of frequency correction imposed on outgoing signals is based on known Doppler between the gateway and each satellite through which communication is established. The amount of shifting required to account for the satellite Doppler can be computed by control processor 320 using known satellite orbital position data. This data can be stored in, and retrieved from, one or more storage elements 346, such as lookup tables or memory elements. This data can also be provided from other data sources, as desired. A variety of well known devices such as RAM and ROM circuits, or magnetic storage devices can be used to construct storage elements 346. This information is used to establish the Doppler adjustment for each satellite being used by the gateway at a given time.

As shown in FIG. 3, a time and frequency unit (TFU) 348 provides reference frequency signals for the analog receiver 314. A Universal Time (UT) signal from a GPS receiver can be used as part of this process in some applications. It can also be employed in multiple intermediate conversion steps, as desired. TFU 348 also serves as a reference for analog transmitter 338. TFU 348 also provides timing signals to other stages or processing elements within gateway transmission and reception apparatus 300 such as the correlators in digital receivers 316A–N and 318, transmit modulator 326, and control processor 320. TFU 348 is also configured to retard or advance the relative timing of (clock) signals, under processor control, by predetermined amounts, as desired.

III. Position Determination

To determine the position of a user terminal in a satellite communications system, the system usually first calculates various parameters describing the geometric relationships between the satellites and the user terminal. Several such approaches exist. One such approach is the triangulation approach, such as that employed by the Global Positioning System (GPS).

In the triangulation approach, each satellite measures a range parameter describing the distance between the satellite and the user terminal. Thus, each range parameter represents a sphere centered on the measuring satellite. The possible positions of the user terminal on the Earth's surface are described by the intersection of the spheres and the Earth's surface. If three satellites (and thus three range parameters) are available, the user terminal's position can be identified unambiguously. However, if less than three range parameters are available, the position of the user terminal cannot be identified unambiguously. For example, if only two range parameters are available, then two possible solutions exist, one being a "mirror" of the other on opposites sides of a satellite sub-track. The sub-track of a satellite is the line on the Earth's surface that lies directly beneath the satellite's path. If only one range parameter is available, then the possible user terminal positions are described by a circle on the Earth's surface, centered on the satellite sub-track.

Another approach is disclosed in a commonly-owned application, filed concurrently herewith, entitled *"Position Determination Using One Low-Earth Orbit Satellite"* having application number (to be assigned, Attorney Docket No. PA286), which is incorporated herein by reference. In one embodiment of that approach, the system measures two parameters describing the geometric relationships between a satellite 104 and a user terminal 106: range and range-rate. The range-rate parameter describes the relative radial velocity between satellite 104 and user terminal 106.

Figure 4:
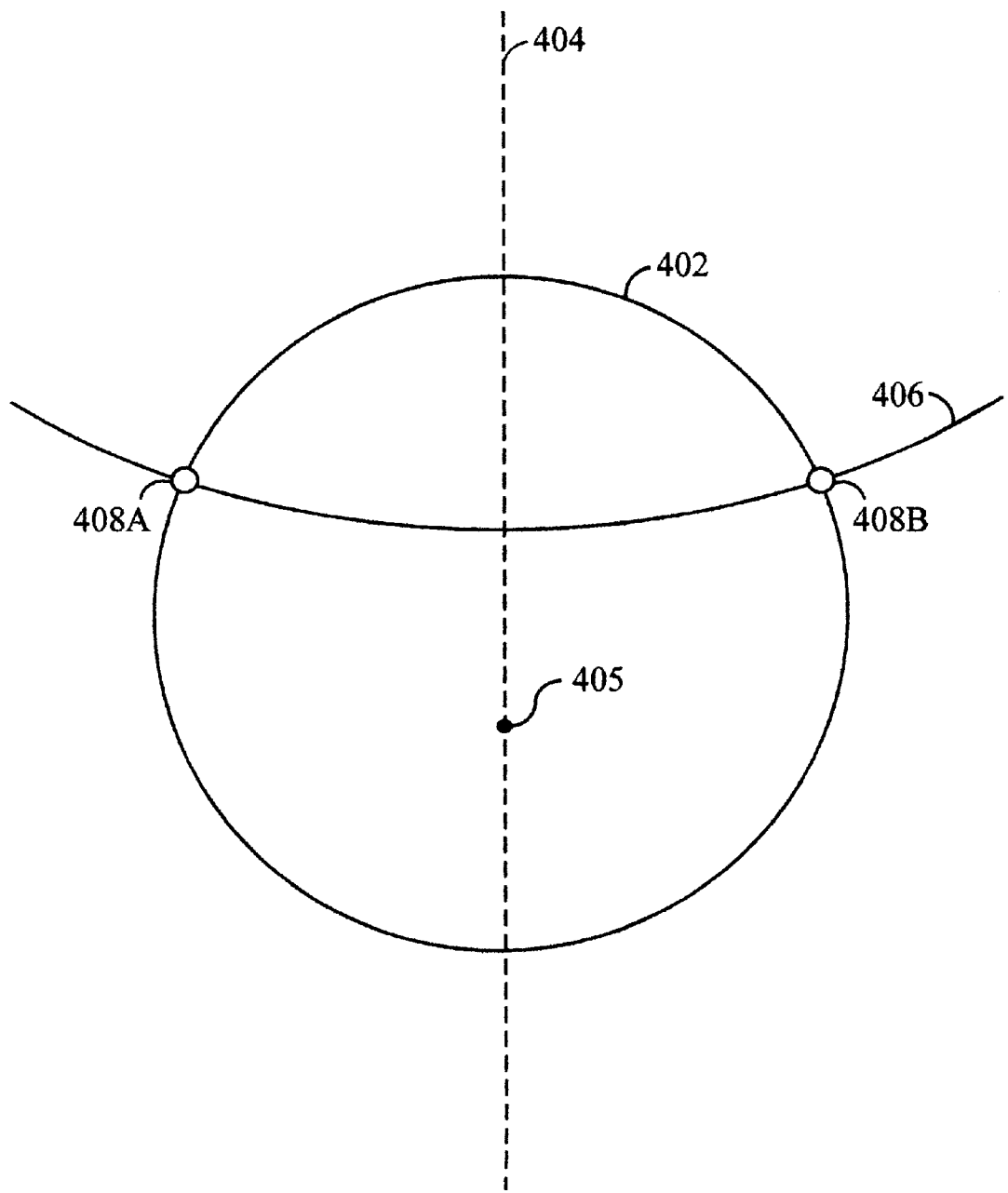
FIG. 4 depicts range and range-rate parameters for a satellite as contours projected onto the Earth's surface.

The range and range-rate parameters for a satellite 104 relative to a user terminal can be depicted as contours projected onto the Earth's surface, as shown in FIG. 4. A range parameter contour describes a circle 402 centered over a sub-track 404 and centered about the current position 405 of the satellite 104, used for the measurements. A range-rate parameter contour describes a hyperbola-like arc 406 that is symmetric with respect to satellite sub-track 404. The use of this approach generally yields an ambiguous position solution 408 that includes two possible positions, correct solution 408A and "mirror" solution 408B, one at each of the two intersections of range parameter contour 402 and range-rate parameter contour 406.

When such an ambiguous position solution is presented, it is desirable to resolve the ambiguity. In a preferred embodiment of the present invention, the ambiguity is resolved using the satellite beams of satellite 104, as described below.

Figure 5:
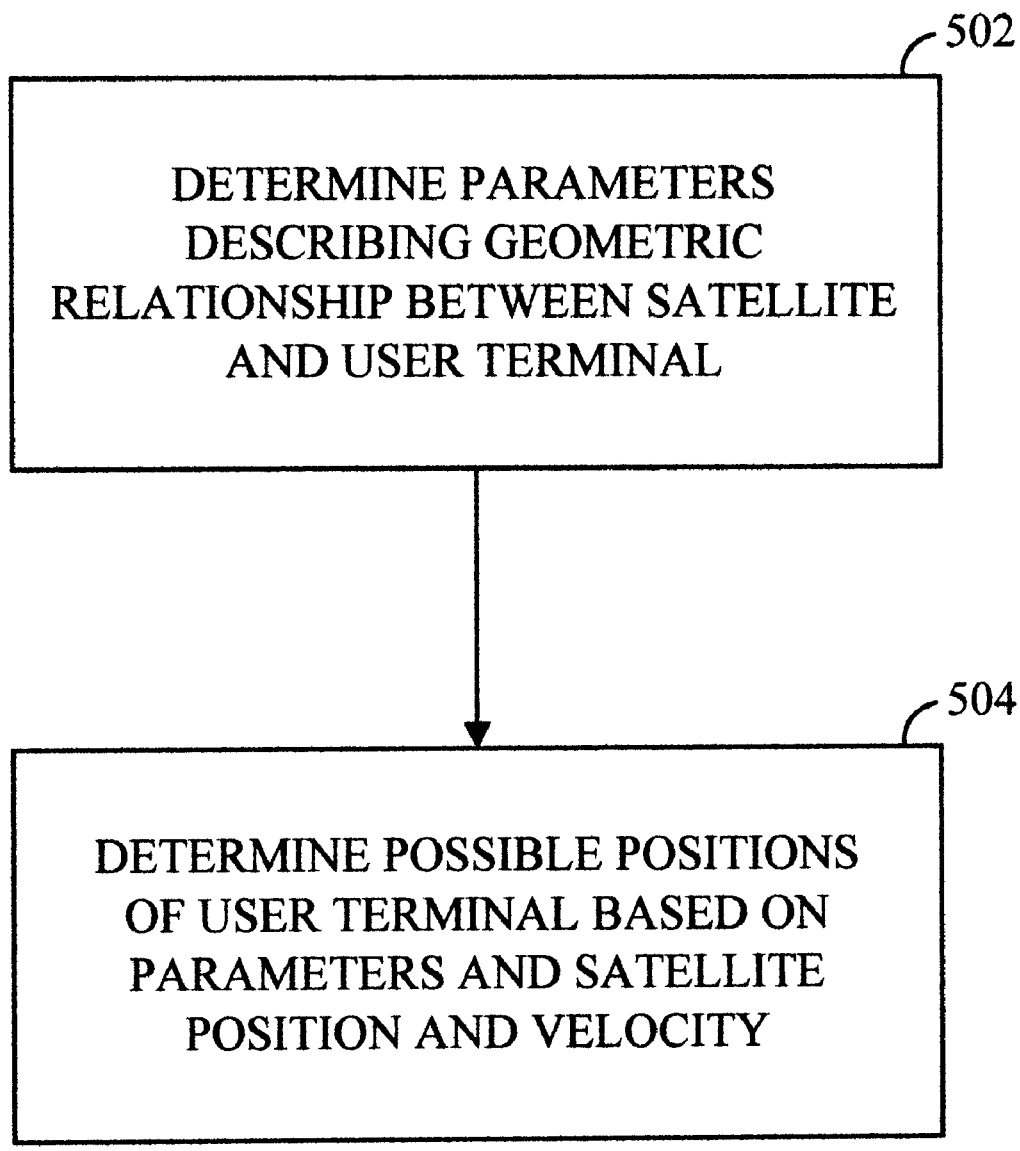
FIG. 5 is a flowchart depicting the operation of a preferred embodiment of the present invention in determining possible position solutions for a user terminal.

FIG. 5 is a flowchart depicting the operation of a preferred embodiment of the present invention in determining the possible position solutions for a user terminal 106. In a step 502, values for certain parameters are determined that describe the geometric relationship between satellite 102 and user terminal 106. The parameters for which values are measured or determined can include, for example, the range and range-rate parameters described above. In a step 504, these parameter values are used to determine two or more possible positions for user terminal 106. Methods for determining the possible positions can include, for example, the triangulation and range/range-rate approaches described above. As would be apparent to one skilled in the relevant art, other parameters and position determination approaches can be employed without departing from the spirit and scope of the present invention.

IV. Position Ambiguity Resolution

Figure 6A:
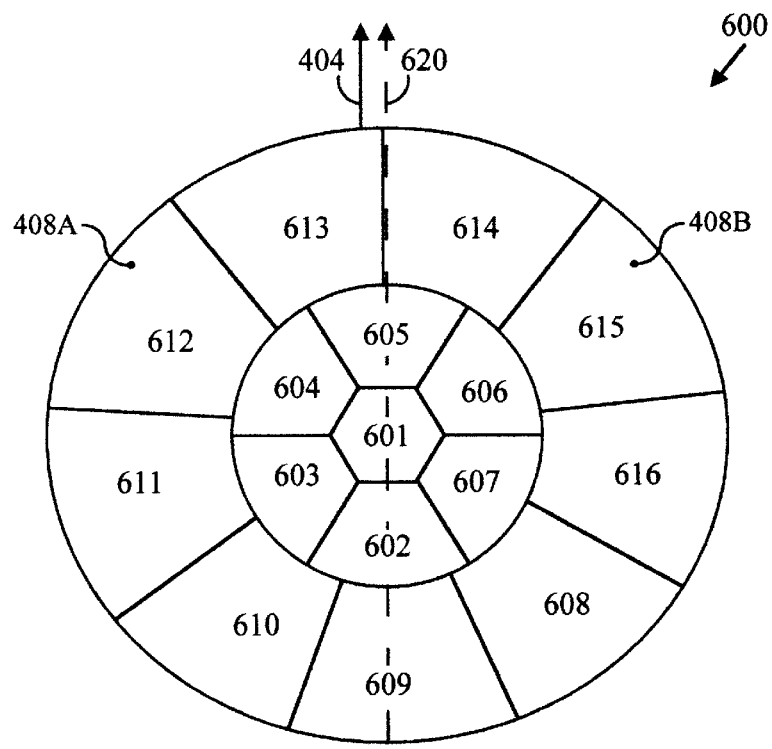
FIGS. 6a and 6b depict exemplary beam patterns for a satellite "spot" according to a preferred embodiment of the present invention.

As described above, communications satellites form beams which illuminate a "spot", or service or coverage area, produced by projecting satellite communications signals onto the Earth's surface. Such a spot 600 is depicted in two forms in FIGS. 6a and 6b. A typical satellite beam pattern for a spot 600 comprises a number of beams arranged in a predetermined coverage pattern. Satellite beams are formed by, for example, a phased-array beamforming antenna, as would be apparent to one skilled in the relevant art. In a preferred embodiment of the present invention, a forward link beam pattern for spot 600 includes sixteen beams 601–616 arranged in a concentric set substantially as shown in FIG. 6a. An alternative beam pattern for spot 600, preferably for a reverse link, includes sixteen beams 621–636 arranged as elongated sections substantially as shown in FIG. 6b.

In a preferred embodiment of the present invention, the different beam patterns are employed for the forward and reverse communications links. This might be done, for example, to provide different gain characteristics for particular beam patterns between the two links, and for improved power density shaping. In addition, different sets of PN codes may be used for forward and reverse link traffic or access channels. In some communication systems, the same beam pattern may be employed for both the forward and reverse communications links, and these beams may even use the same PN spreading codes. However, other beam arrangements can be employed without departing from the spirit and scope of the present invention.

Different arrangements can be employed in accordance with the present invention so long as a multiple-beam pattern is employed on at least one of the forward and reverse links. For example, a multiple-beam pattern can be employed only on the forward link or only on the reverse link.

Figure 6B:
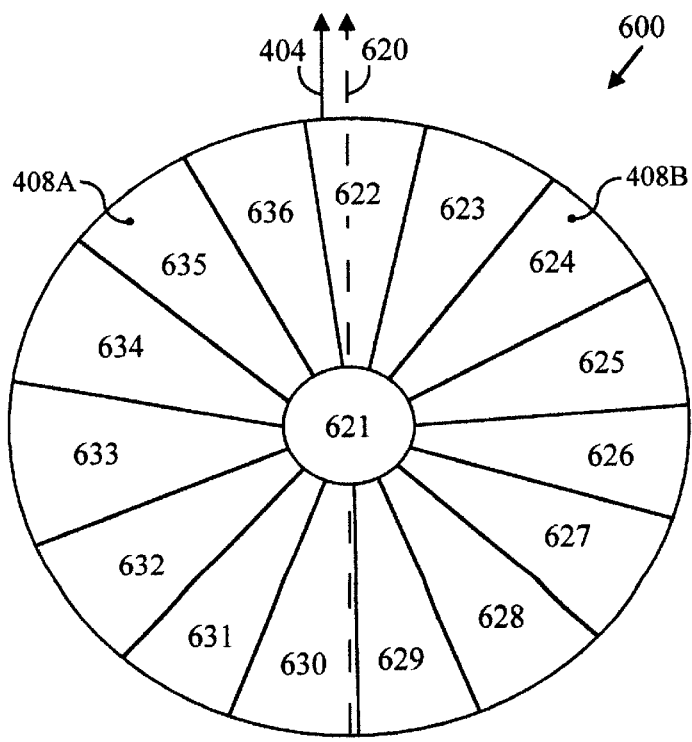

FIGS. 6a and 6b also each depict a sub-track 404 and a velocity vector 620 related to spot 600 produced by a satellite 104. Velocity vector 620 indicates the direction of travel of the satellite along its corresponding sub-track.

It should be noted that spot 600 may rotate with respect to sub-track 404. Communication satellites are generally powered by solar panels. Solar panels operate most efficiently when presented in a normal orientation to the sun. Therefore, it is generally desirable to maintain a particular panel orientation relative to incident sunlight for optimizing satellite power generation. Because communication satellites are generally maintained in sun-synchronous orientations, each satellite may rotate with respect to its velocity vector to maintain a desired orientation relative to the sun. Consequently, spot 600 may rotate with respect to the satellite sub-track. Such rotations in orientation may differ in terms of degree, direction, and rate of change from satellite to satellite at any given time, dependent upon various well known factors. However, such changes represent well known positional variations within the communication system, which can be accounted for by each gateway.

In a preferred embodiment of the present invention, the beams within a satellite spot are used to resolve the ambiguity in a user terminal position solution. According to a preferred embodiment of the present invention, the correct solution is selected by identifying the beam within which the user terminal is located, at the time of interest. In a preferred embodiment, satellite 104 broadcasts the identity of each satellite beam over that beam. Each user terminal using a beam, or signals in the beam, receives the satellite beam identity as part of such signals, detects or ascertains that identity, and reports it back to the gateway. The gateway thus maintains the beam identity for each user terminal.

The beam identity can be provided for example using system paging signals. A predetermined portion or field in each paging signal can be used to list or designate an identifier or ID for the beam it is transmitted over. When the paging signal is generated, an appropriate beam identifier for the specific beam over which it is intended to be transferred is selected and inserted into the paging signal message structure. A beam ID can take on many different forms using a variety of known alphanumerical patterns or indexing schemes, and is established by the communication system and satellite designs. In the present example, each beam is provided with a unique numerical designation, 601–616 and 621–636. Additional symbols can be used to identify specific satellites and sub-beams, as desired.

In the alternative, beam identification is derived from the PN spreading code assignment pattern. That is, as discussed above, each satellite sub-beam in a beam uses a particular PN code, including a basic code sequence and timing offset, depending upon known system signal source PN code assignments. Therefore, a user terminal can identify a received sub-beam, and thus beam, according to the PN code (and timing) used to acquire and receive signals over the sub-beam. The user terminal can use known code assignment information, such as can be stored in a memory element, to determine which beam corresponds to the detected PN code. The user terminal then reports the beam identification to the gateway.

For purposes of reporting beam identification to the gateway, the user terminal need not "identify" the beam per se, but can simply report the PN code used. The gateway then uses known communication system code assignment information, which might be stored in one or more memory devices within the gateway, to determine which beam corresponds to the PN code information, or any other parameter being used.

Apparatus for accomplishing the beam identity detection are known in the art, and generally form part of the receivers and control processors discussed above. Those receivers detect which PN spreading codes are used to form the signals being received, including applicable PN code offsets, and decode messages that may also contain identification information. However, additional separate beam identification components can also be used, as desired.

Other beam identification processes can also be employed as desired, such as transmitting pre-assigned "beam IDs" over synchronization channels associated with pilot signals, and detecting such IDs in conjunction with acquiring pilot timing, and so forth. The present invention is not limited to, nor dependent upon, the specific beam identification techniques discussed above. At the same time, the present invention is not strictly limited to using CDMA signals, as long as there are discernible beams being employed by the communication system, and each has identification information which can be detected by the user terminal and the gateway.

The above process assumes a forward link beam identification technique. In the alternative, a reverse link identification process can be used. Here, a gateway receives user terminal communication signals, such as access probes for commencing communications, or reverse link traffic signals. In either case, the signals arrive using a particular beam scanning for user terminal signals. The gateway knows which beam the satellite has used to receive the reverse link signals. The beams are well identified to the gateway according to the schemes listed above and various frequency assignment schemes. Therefore, the gateway automatically receives information as to which beam a user terminal is using when reverse link signals are used.

The gateway also maintains information describing the specific position and orientation of each satellite, and, therefore, each beam projected by the satellite, as it transits in orbit. This information is available as part of the communication system design, and might be stored in one or more memory devices within the gateway. This satellite orientation information can also be updated from time to time by system operators as a result of various satellite orbital position measurements.

Knowledge of the orientation or position relative to the satellite sub-track for each satellite beam, allows a determination as to which side of that track the beam is on, at any given time. Thus, any possible or predicted position for a user terminal falling on an incorrect side of the sub-track from the detected beam illuminating the user terminal, is an incorrect solution for that user terminal. Furthermore, if only one of several possible positions of the user terminal falls within or on the same side of the track as the beam detected as illuminating that user terminal, that possible position is the correct position.

It will be readily understood by those skilled in the art that the "beam solution" as it were, need not be "geographically" correct. That is, a gateway, or user terminal, could predict that certain beams cover certain preselected geographical areas on the surface of the Earth, at any one time. However, even if such assumptions are made and are incorrect at the time, the use of the beam identification information will still result in an accurate determination as to which side of the sub-track the user terminal is on. This determination does not rely on any particular coverage area for the beams, but only on the orientation of the satellites and their projected beams, and the beam identification process itself. This presents the information desired to resolve ambiguity in position determination techniques.

As an example, the present invention is applied to resolve the position ambiguity presented in FIG. 4. The ambiguous position solution 408 presented in FIG. 4 is also depicted in FIG. 6. Ambiguous position solution 408 includes two possible positions 408A and 408B. Referring to FIG. 6, possible solutions 408 fall within different beams of spot 600, which is moving along sub-track 404. One solution 408A falls within beam 612, while the other solution 408B falls within beam 615. According to the present invention, the gateway determines that the user terminal is within beam 612. As a result of the known orientation or position of beam 612 relative to satellite 104 and sub-track 404, the gateway knows that the user terminal is positioned on the side of sub-track 404 closest to solution 408A and furthermost from solution 408B. Therefore, position 408A is chosen by the gateway as the user terminal location.

Where the user terminal is determining position based on information provided by the gateway, an indication as to which side of the sub-track the gateway believes the user terminal to be on, can also be provided as part of this information to the user terminal.

It should also be noted that some beams, such as beams 601, 602, 605, and 609 in FIG. 6, extend somewhat symmetrically onto both sides the satellite sub-track, 404. While this might at first appear to present a problem, it is of limited scope and duration. Generally, the position determination solutions do not fall that close to the sub-track, such that one of these beams is an issue. However, as discussed above, in a preferred embodiment, different reverse and forward link beam patterns are used. Therefore, a gateway effectively has multiple beams, such as 622, 623, 629, 630, and 636, to chose from in determining the location of a user terminal. Consequently, differences between the two patterns, forward and reverse link, minimize non-determinative solutions. This is also true if other sets of patterns are chosen for use. In addition, in some communication systems it is possible a substantial rotation speed may be imparted to the satellites. In this configuration, the spots or beam patterns rotate rapidly, quickly changing which beams service a user terminal, and creating desired beam resolution arrangements.

Figure 7:
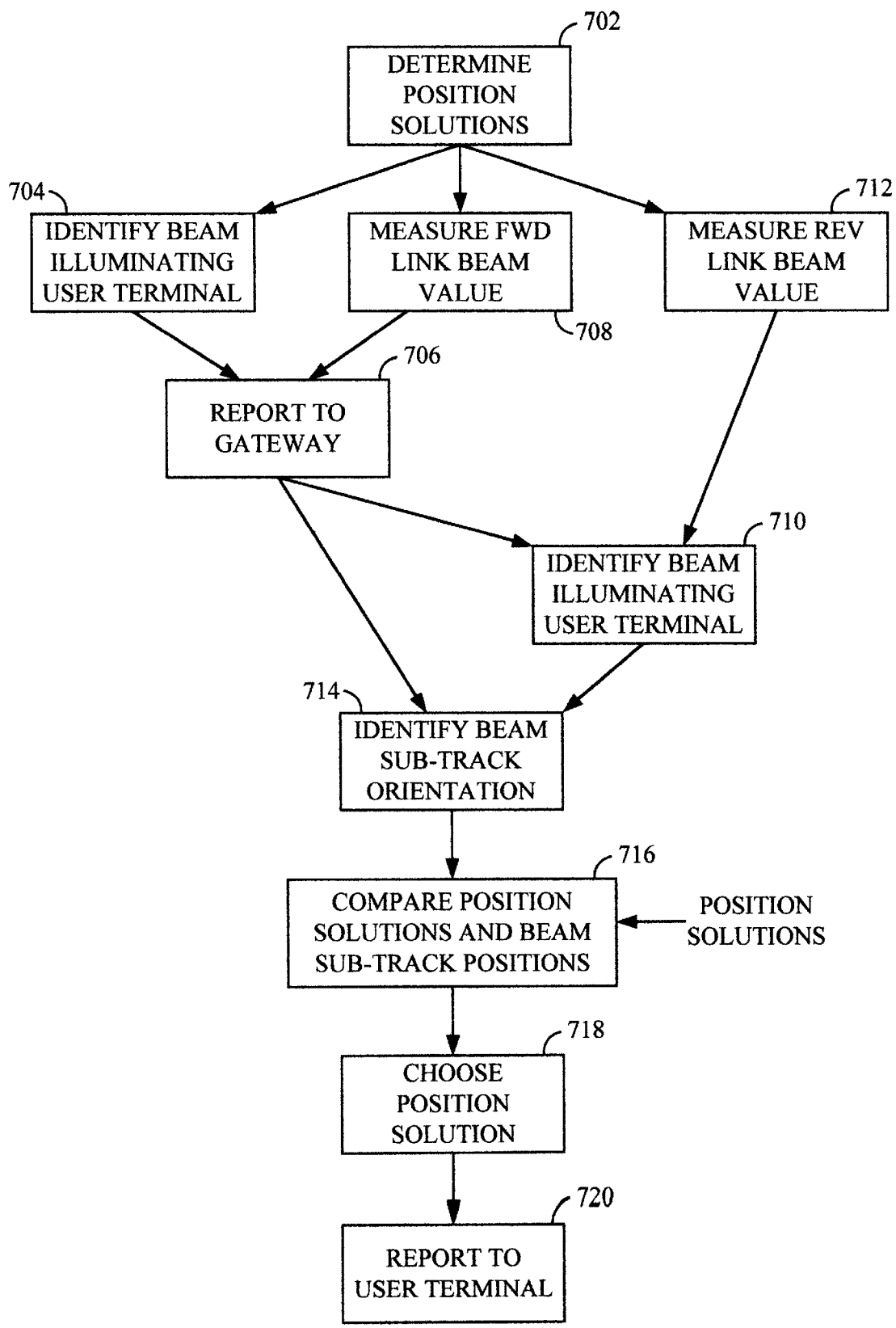
FIG. 7 is a flowchart depicting the operation of the present invention according to a preferred embodiment.

FIG. 7 is a flowchart depicting various steps in the operation of the present invention according to a preferred embodiment. The operation of the present invention begins when communications system 100 has determined an ambiguous solution for the position of a user terminal 106, as shown in a step 702. In a preferred embodiment, the ambiguous position solution is determined by processors 320 and 321 within gateway 102 using the positioning method described above. However, additional or separate computation and memory elements well known in the art can be used for making this determination from information provided by a user terminal and available within the gateway. The ambiguous solution includes two or more possible positions for user terminal 106. Each of the possible positions falls within one of the beams 601–616 of spot 600, or 621–636.

The satellite beam illuminating, transmitting signals to or retrieving signals from, user terminal 106 is identified by the user terminal, as shown in a step 704. In a preferred embodiment of the present invention, the identity of each satellite beam is detected as part of receiving a paging signal. Upon receipt or detection of the satellite beam identity, user terminal 106 transmits this information to gateway 102 as part of an access signal, in a step 706. However, user terminal 106 can transmit the beam identification information using other known signals in step 706, as desired.

In the alternative, user terminal 106 does not determine an actual beam identification, but determines the value of a particular beam specific parameter, or one which is individually associated with each beam, in a step 708. For example, user terminal 106 can detect the PN code (timing offset) used to acquire and receive signals over a sub-beam, and report this information to the gateway in step 706. The gateway then uses known communication system code assignment information, in a step 710, to identify the beam illuminating the user terminal.

However, the gateway may use reverse link beam identification as part of this process, and can detect which reverse link beam is being used by a user terminal directly. This alternative is shown in FIG. 7 where the gateway measures a reverse link beam specific parameter value in a step 712. For example, the gateway determines which access probe specific PN code is being used when acquiring a reverse link access requests. Similar information is available from reverse link traffic channels. This information is used in step 710 to identify the beam.

User terminal 106 can also transmit beam identification related information on a periodic basis, such as when communicating using traffic, or access, signals. This allows gateway 102 to periodically determine the current beam servicing the user terminal, either forward and/or reverse link as appropriate, and have an ambiguity resolution factor ready for position determination processing, which might also occur periodically.

Gateway 102 receives the beam identification information, either from the user terminal forward link beam measurement or determination, and/or from the reverse link beam determination processes. Based on information regarding the orientation of each satellite beam maintained by the gateway, from communication system information, as discussed above, a determination is made as to which side of the satellite track a user terminal is located on, in a step 714. In a step 716, the possible positions for user terminal 106 are compared in relation to their sub-track positions or orientation to the identified satellite beam to select the possible positions falling within the identified beam. If only one possible position falls within the coverage of the identified beam, the other possible positions can be eliminated as incorrect in a solution selection step 718. Thus, the ambiguity in the position solution is resolved.

Where used for certain positioning operations, the position solution selected as the "correct" or most likely solution, is provided to the user terminal as part of one or more known forward link message signals, in a step 720.

V. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What I claim as the invention is:

1. Apparatus for resolving ambiguity in position determinations for a satellite communications system, comprising:

a user terminal;

at least one satellite having a first plurality of satellite beams for forward link communications and a second plurality of beams for reverse link communications each communicating with a region of the Earth's surface in a known pattern relative to a satellite sub-track, the beam pattern of each plurality differing from that of the other;

a gateway communicating with said user terminal through said at least one satellite using at least one of said first and second plurality of satellite beams, and being configured for determining a plurality of possible positions of said user terminal on the Earth's surface;

first identification means for identifying a first satellite beam communicating with said user terminal on said forward link and a corresponding side of said sub-track said first beam is on;

second identification means for identifying a second satellite beam communicating with said user terminal on said reverse link and a corresponding side of said sub-track said second beam is on; and comparison means for comparing said plurality of possible positions with said corresponding sub-track sides for said first and second identified satellite beams to select one of said plurality of possible positions based on the result of said comparison.

2. The ambiguity resolution apparatus of claim 1 further comprising:

first identification means in said user terminal for detecting at least one beam specific parameter for said first satellite beam illuminating said user terminal;

transfer means in said user terminal for reporting a value for said beam specific parameter to said gateway; and reception means in said gateway for receiving said value and for identifying said first satellite beam illuminating said user terminal based on said reported value; and second identification means in said gateway for identifying said second satellite beam used by said user terminal on said reverse link to communicate with said gateway.

3. The ambiguity resolution apparatus of claim 2 wherein said one beam specific parameter comprises a PN code phase.

4. The ambiguity resolution apparatus of claim 1, further comprising means for determining a plurality of possible positions of said user terminal on the Earth's surface.

5. The ambiguity resolution apparatus of claim 4, wherein said means for determining comprises:

parameter determining means for determining a plurality of parameters describing the geometric relationships between said user terminal and said at least one satellite; and position determining means for determining said plurality of possible positions based on said plurality of parameters and said position and velocity of said at least one satellite.

6. The ambiguity resolution apparatus of claim 5, wherein said parameter determining means comprises range parameter determining means for determining a range parameter.

7. The ambiguity resolution apparatus of claim 5, wherein said parameter determining means comprises range-rate parameter determining means for determining a range-rate parameter.

8. A position determining system for a satellite communications system, comprising:
  a user terminal;
  at least one satellite having a first plurality of satellite beams for forward link communications and a second plurality of beams for reverse link communications, each satellite beam communicating with a region of the Earth's surface in a known pattern relative to a satellite sub-track, the beam pattern of each plurality differing from that of the other;
  a gateway communicating with said user terminal through said at least one satellite using at least one of said first and second plurality of satellite beams;
  range parameter determining means for determining a range parameter;
  range-rate parameter determining means for determining a range-rate parameter;
  position determining means in said gateway for determining a plurality of possible positions of said user terminal on the Earth's surface based on said range parameter, said range-rate parameter, and position and velocity of said at least one satellite;
  first identification means for identifying a first satellite beam illuminating said user terminal on said forward link and a corresponding side of said sub-track said first beam is on;
  second identification means for identifying a second satellite beam communicating with said user terminal on said reverse link and a corresponding side of said sub-track said second beam is on; and
  comparison means for comparing said plurality of possible positions with said corresponding sub-track sides for said first and second identified satellite beams to select one of said plurality of possible positions based on the result of said comparison.

9. In a communications system comprising a user terminal, at least one satellite, and a gateway for communicating with the user terminal through the satellite and determining a plurality of possible positions of the user terminal on the Earth's surface, each satellite having a first plurality of satellite beams for forward link communications and a second plurality of beams for reverse link communications each communicating with a region of the Earth's surface in a known pattern relative to a satellite sub-track, the beam pattern of each plurality differing from that of the other, a method for resolving ambiguity in the position of the user terminal on the Earth's surface, comprising the steps of:
  identifying a first beam of said first plurality of satellite beams which is illuminating the user terminal on said forward link and a first corresponding side of a satellite sub-track said first beam is positioned on;
  identifying a second beam of said second plurality of satellite beams which is communicating with said user terminal on said reverse link and a second corresponding side of a satellite sub-track said second beam is positioned on; and
  comparing the plurality of possible positions with the said determined first and second sub-track sides for said identified satellite beams to select one of the plurality of possible positions based on the result of said comparison.

10. The ambiguity resolution method of claim 9 further comprising the steps of:
  detecting at least one beam specific parameter for the satellite first beam communicating with said user terminal on said forward link;
  reporting a value for said beam specific parameter from said user terminal to said gateway; and
  receiving said value in said gateway and identifying said first satellite beam illuminating said user terminal based on said reported value.

11. The ambiguity resolution method of claim 10 wherein said step of detecting one beam specific parameter comprises detecting a phase of a received PN code.

12. The ambiguity resolution method of claim 9, further comprising the step of determining the plurality of possible positions of the user terminal on the Earth's surface.

13. The system of claim 12, wherein said determining step comprises the steps of:
  determining a plurality of parameters describing the geometric relationships between the user terminal and the at least one satellite; and
  determining the plurality of possible positions based on said plurality of parameters and the position and velocity of the at least one satellite.

14. The method of claim 13, wherein said plurality of parameters includes a range parameter.

15. The method of claim 13, wherein said plurality of parameters includes a range-rate parameter.

* * * * *